United States Patent
Princigallo et al.

(10) Patent No.: US 9,593,045 B2
(45) Date of Patent: Mar. 14, 2017

(54) CEMENTITIOUS COMPOSITION FOR FORMING MORTARS OR CONCRETES HAVING REDUCED TENDENCY TO REACT WITH ALKALI

(71) Applicant: ITALCEMENTI S.P.A., Bergamo (IT)

(72) Inventors: Antonio Princigallo, Stezzano (IT); Stefano Cangiano, Torre De Roveir (IT)

(73) Assignee: ITALCEMENTI S.P.A., Bergamo (IT)

( * ) Notice: Subject to any disclaimer, the term of this patent is extended or adjusted under 35 U.S.C. 154(b) by 0 days.

(21) Appl. No.: 14/366,599

(22) PCT Filed: Dec. 20, 2012

(86) PCT No.: PCT/EP2012/076326
§ 371 (c)(1),
(2) Date: Jun. 18, 2014

(87) PCT Pub. No.: WO2013/092827
PCT Pub. Date: Jun. 27, 2013

(65) Prior Publication Data
US 2015/0122155 A1    May 7, 2015

(30) Foreign Application Priority Data
Dec. 20, 2011 (IT) ............... MI2011A2327

(51) Int. Cl.
C04B 24/12    (2006.01)
C04B 28/02    (2006.01)
C04B 103/60   (2006.01)
C04B 111/20   (2006.01)

(52) U.S. Cl.
CPC ............ C04B 24/123 (2013.01); C04B 28/02 (2013.01); *C04B 2103/603* (2013.01); *C04B 2111/2023* (2013.01)

(58) Field of Classification Search
CPC ....... C04B 24/123; C04B 28/02; C04B 14/00; C04B 2103/603; C04B 2111/2023

USPC .................................... 106/727, 808
See application file for complete search history.

(56) References Cited

U.S. PATENT DOCUMENTS 2,499,445 A      3/1950  Ammann
7,771,529 B1 *   8/2010  McPherson ............ C04B 14/22
                                                       106/716

FOREIGN PATENT DOCUMENTS

JP        62-46944 A  *  2/1987  ............. C04B 24/12

OTHER PUBLICATIONS

International Search Report and Written Opinion dated Feb. 26, 2013 for corresponding international patent application No. PCT/EP2012/076326.
Wang H. et al., Effect of some chemicals on alkali-silica reaction; Proceedings of the 9th International Conference on Alkali Silica Reaction, Anonymous, UK, vol. 9th, Jan. 1, 1998.
H. Wang et al., Mechanism of alkali-silica reaction and the significance of calcium hydroxide; Cement and Concrete Research, vol. 21, No. 4, Jul. 1, 1991.
Taplin, J.E., Proc. 4th Int. Symp. Cement Chem., Nat. Bur. St. (U.S.) Monog. 43, pp. 924-925, 1962.
Wilding, C.R., et al., A Classification of inorganic and organic admixtures by conduction calorimetry; Cement and Concrete Research, vol. 14, pp. 185-194, 1984.
Thomas and Double, The hydration of portland cement, C3S and C2S in the presence of a calcium complexing admixture (EDTA), Cement and Concrete Research, vol. 13, pp. 391-400, 1983.

* cited by examiner

*Primary Examiner* — Anthony J Green
(74) *Attorney, Agent, or Firm* — Abelman, Frayne & Schwab

(57)    ABSTRACT

The invention has as object a cementitious composition for forming mortars or concretes having reduced tendency to react with alkali, characterized in that it comprises as additive at least a compound of general formula:

$$[R-N-(CH_2-COOH)_n]_x \qquad (I)$$

R being an aliphatic or aromatic hydrocarbon chain, n=2 or 3 and x=1 or 2.

2 Claims, No Drawings

CEMENTITIOUS COMPOSITION FOR FORMING MORTARS OR CONCRETES HAVING REDUCED TENDENCY TO REACT WITH ALKALI

CROSS REFERENCE TO RELATED APPLICATIONS

This application is a national phase of PCT application No. PCT/EP2012/076326, filed Dec. 20, 2012, which claims priority to IT patent application No. MI2011A002327, filed Dec. 20, 2011, all of which are incorporated herein by reference thereto.

FIELD OF THE INVENTION

The present invention relates to a cementitious composition for forming mortars or concretes having reduced tendency to react with alkali.

PRIOR ART

In the concretes and mortars field, the alkali-aggregate reaction (AAR) is an end product degradation phenomenon associated with a chemical reaction between reactive silica contained in certain types of aggregate and the cement matrix. It is generally accepted that the alkali-aggregate reaction can take place when the following series of conditions occur simultaneously:

i. Presence of sufficient moisture in the concrete (permanently or temporarily)
ii. Presence in the aggregates of a sufficient content of species reactive to alkalis (primarily reactive silica)
iii. Presence of a sufficient content of alkali to the cement paste placed in contact with the aggregates.

The AAR phenomenon is generally difficult to control since the physicochemical mechanisms that govern the evolution thereof have very slow kinetics. The negative effect on the works can also be seen many years after the execution thereof, through the development of a network of cracks in concrete. The mechanical characteristics of the concrete can consequently be degraded and/or the functionality of the work may be lost.

The mechanism of action of the AAR comprises an initial step of increasing the alkalinity of the solution following the dissolution of sodium, potassium and calcium ions from different sources. In a subsequent step, the Si—O bonds in the silica exposed on the surface of the aggregate are hydrated to form a gel containing $H_2SiO_4^{2-}$, $H_3SiO_4^{-}$ ions and cations such as K+, Na+, $Ca^{2+}$ in varying proportions. This gel coating the surface of the aggregate exposed to attack tends to absorb water molecules and to expand, locally generating tractive forces in the cement matrix, which can fracture where sufficient resistance to traction has not been developed.

More in particular, the hydroxyl ions generated from hydration of the alkali act as primer of the chemical reaction, thus the establishment of a high pH can generally be considered a favourable condition for the reaction itself.

The occurrence of AAR can lead to undesired phenomena in the works, such as:

widespread cracking
discolouration around the cracks
exudation of gel from the cracks
misalignment of adjacent sections
joint closures
localized explosion phenomena To limit the occurrence of the AAR phenomenon, one can intervene on the basic mechanisms of the phenomenon by attempting to exclude at least one of the conditions (i, ii, iii) above. More in particular, point (i) being strongly dependent on the conditions of product exposure and point (ii) being inherent to the origin of the aggregates, modifying the effects thereof is often difficult or impractical. As concerns point (iii), certain possible strategies for reducing the risk of AAR occurrence are:

I. use of components for concrete having a limited alkali content
II. use of materials with latent hydraulic or pozzolanic activity mixed with the concrete (pozzolanas, fly ash, dross, microsilica, metakaolin, etc.).
III. use of inhibitor additives, which is the case of the present invention.

SUMMARY OF THE INVENTION

According to the present invention, a cementitious composition is proposed, that is for forming mortars or concretes having reduced tendency to react with alkali, characterized in that it comprises as an additive at least a compound of general formula:

R being an aliphatic or aromatic hydrocarbon chain, n=2 or 3 and x=1 or 2. The following are preferred compounds of general formula (I):

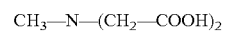

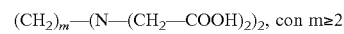

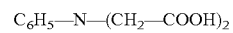

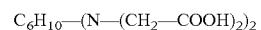

One overall preferred compound of general formula (I) is ethylene diamine tetraacetic acid, or EDTA, of formula:

The present invention also has as object a composition comprising at least one hydraulic binder, water and, optionally, one or more aggregates, and/or one or more mineral additions, and/or fibres for cements, and/or one or more additives, preferably comprising at least one of the compounds of general formula (I) in an amount by weight ranging from 0.01% and 1% by weight with respect to the binder, as inhibitor of AAR.

In one embodiment, this composition comprises EDTA in an amount by weight ranging from 0.2% to 0.4% by weight with respect to the binder.

Preferably, it comprises EDTA in amount by weight equal to 0.28% by weight.

The present invention also has as object an addition for a cementitious composition for forming mortars or concretes having reduced tendency to react with alkali, characterized in that it comprises at least one of said compounds of general formula:

R being an aliphatic or aromatic hydrocarbon chain, n=2 or 3 and x=1 or 2. The present invention also has as object the use of at least one compound of general formula:

R being an aliphatic or aromatic hydrocarbon chain, n=2 or 3 and x=1 or 2.

as an additive for a cementitious mixture for forming mortars or concretes in order to reduce the tendency to react with alkali of mortar or concrete.

The term hydraulic means a material in powder form, in dry state, which when mixed with water, provides plastic mixtures that are able to solidify and harden. Cements means in particular those included in European EN 197-1 standard.

The cementitious compositions in question are divided into pastes, i.e. compositions free of inert aggregates, and conglomerates, i.e. compositions containing at least one inert aggregate. The conglomerates are in turn divided in mortars, containing fine aggregates such as for example sand, and concretes, containing both fine aggregates and coarse aggregates such as gravel, pebbles and crushed aggregate selected for example from those classified according to the European EN 12620 standard.

The present invention is directed at mortars and concretes in particular.

Mineral addition means any type of finely subdivided inorganic material that can be added to the concrete to impart improved mechanical resistance and durability characteristics. The additions can be inert, pozzolanic or can have latent hydraulic activity, for example selected from those permitted by European EN 206-1 standard.

For example, a concrete compliant with European EN 206-1 standard, having an addition in excess of 10 kg/m$^3$ is object of the invention.

According to the present invention, at least one compound of formula (I), for example EDTA, is introduced as an additive to the cementitious mixture, for example to form concrete, directly into the mixer or preventively dissolved in the mixing water or on the addition thereof.

The amount of EDTA added to the cementitious mixture is preferably between 0.01% and 1% by weight of hydraulic binder. More preferably, the dose of EDTA is between 0.2% and 0.4% by weight of binder. Even more preferably, the dose of EDTA is equal to 0.28% by weight of binder.

In the present invention binder means the sum of cement and addition.

A cement of the present invention is in particular selected according to European EN 197-1 standard. An addition is in particular selected according to European EN 206-1 standard.

A cementitious mixture according to the present invention may comprise additions with latent hydraulic or pozzolanic activity, such as fly ash, microsilica, finely ground granulated blast furnace slag. As hydraulic binders said cements according to European EN 197-1 standard are preferred.

DETAILED DESCRIPTION OF THE INVENTION

Characteristics and advantages of the present invention are described in grater detail in the following examples, provided by way of a non-limiting example of the present invention.

EXAMPLES

In the described examples, EDTA was used for the preparation of mortar mixtures according to the invention, dissolving it in the mixing water in the mixer.

Aggregate containing reactive silica and that is therefore susceptible to AAR was used; the reactive species content was 25% on average. NaOH was introduced to the mixtures as an alkali source, dissolved in the mixing water in the content of 1% by weight expressed as $Na_2O$ referring to the binder.

Mortar specimens were prepared having 4 cm×4 cm×16 cm dimensions were prepared. The determination of performance was performed by measuring the deformation of the specimens, 24 hours from casting, under the following conditions:

in a 1N of NaOH solution at 80° C., onerous both due to the high temperature and due to the continuous supply of alkali during exposure.

in water at 60° C., onerous on account of the acceleration of the speed of the AAR due to the high temperature exposure.

Example 1

The effect of EDTA in modifying AAR was evaluated in mortar mixtures containing fly ash, as shown in Table 1, using strongly accelerating conditions of exposure (NaOH 1N at 80° C.). or performance of the tests, the following proportions of mixture were adopted using a cement CEM II/A-LL 42.5 R: water-binder ratio equal to 0.55—binder weight—NaOH dissolved in the mixing water in a proportion of 1% by weight expressed as weight of $Na_2O$ relating to the binder, understood as the sum of the cement and pozzolanic addition. EDTA was added to one of the two mixtures in a proportion of 0.28% by weight of binder, equal to a value of 0.07% by weight referring to the mortar. A second mixture wherein EDTA was not added is shown as reference. It can be observed that using EDTA, the expansions were significantly reduced, the desired technical effect thereby being achieved.

TABLE 1

| Deformation (expansion) | Maturation in NaOH 1N at 80° C. | | | |
|---|---|---|---|---|
| [μm/m] | 7 days | 14 days | 28 days | 90 days |
| Reference | 581 | 931 | 1313 | 2144 |
| EDTA 0.07% (present invention) | 331 | 463 | 731 | 1200 |

Example 2

The positive effect of EDTA in reducing AAR was verified from tests on mortar mixtures containing fly ash, as shown in Table 2, using accelerating conditions of exposure (water at 60° C.).

The following mixture proportions, using CEM II/A-LL 42.5 R, were adopted for performance of the tests:

water/binder ratio equal to 0.55 aggregate/binder ratio equal to 2.25 fly ash in a proportion of 20% by weight of binder

NaOH dissolved in the mixing water in a proportion of 1% by weight expressed as weight of $Na_2O$ referring to the binder.

EDTA was introduced into one of the two mixtures in a proportion of 0.28% by weight of binder, equal to 0.07% by weight referring to the mortar. A second mixture wherein EDTA was not added is shown as reference.

It can be observed the expansions were significantly reduced using EDTA.

TABLE 2

| Deformation (expansion) | Maturation in water at 60° C. | | | |
|---|---|---|---|---|
| [μm/m] | 7 days | 14 days | 28 days | 90 days |
| Reference | 210 | 150 | 191 | 263 |
| EDTA 0.07% (present invention) | 110 | 63 | 47 | 113 |

Example 3

The positive effect of EDTA in reducing AAR was verified by tests on mortar mixtures containing powdered glass as addition. The physicochemical characteristics of the powdered glass in question are shown in Table 3 and Table 4.

TABLE 3

| reactive $SiO_2$ [%] | 52.88 |
|---|---|
| $SiO_2$ [%] | 69.0 |
| $Al_2O_3$ [%] | 2.70 |
| $Fe_2O_3$ [%] | 0.36 |
| CaO [%] | 8.84 |
| MgO [%] | 1.44 |
| $Na_2O$ [%] | 15.6 |
| $K_2O$ [%] | 0.84 |

TABLE 4

| BET | $m^2/g$ | 0.59 |
|---|---|---|
| Density - ρ | $g/cm^3$ | 2.540 |
| Laser - Sv (specific surface) | $m^2/cm^3$ | 0.99 |
| Laser - xp (average diameter) | μm | 16.7 |
| Laser - n (amplitude) | — | 1.23 |

The following mixture proportions were adopted for performance of the tests:
fly ash in a proportion of 20% by weight of binder
aggregate/binder ratio equal to 1.88
water/binder ratio equal to 0.49
NaOH dissolved in the mixing water in a proportion of 1% by weight expressed as weight of $Na_2O$ referring to the binder.
Binder means the sum of cement and powdered glass.
EDTA is added to one of the two mixtures in a proportion of 0.28% by weight of binder, equal to 0.1% by weight of mortar. A second mixture wherein EDTA was not added is shown as reference.

Table 5 shows the results of tests of the expansion tests in mortar under strongly accelerating conditions of exposure of the AAR (NaOH 1N at 80° C.). It can be observed that by using EDTA the expansions were significantly reduced as follows.

TABLE 5

| Deformation (expansion) | Maturation in NaOH 1N at 80° C. | | | | |
|---|---|---|---|---|---|
| [μm/m] | 7 days | 14 days | 28 days | 90 days | 126 days |
| Reference | 3363 | 4131 | 5119 | 7456 | 8844 |
| EDTA 0.1% (present invention) | 2494 | 3394 | 3638 | 4638 | 4644 |

Example 4

The present example shows that, although EDTA is an acid, its use as an additive for concrete according to the present invention has not shown abatement of the mechanical characteristics arising from negative interactions with a strongly basic cementitious matrix.

Table 6 records the determinations of dynamic elastic modulus of the same specimens for which the expansions were recorded in the preceding Table 1 and Table 2.

It can be derived from Table 6 that it there has been no decrease in elastic modulus in the time, but that there has been, on the contrary, an increase between 30 and 50%, between 1 and 90 days, in all examined cases.

TABLE 6

| Specimens the expansions of which are shown in | | Dynamic elastic modulus (1 day) [MPa] | Dynamic elastic modulus (90 days) [MPa] | % increase |
|---|---|---|---|---|
| Table 1 | Reference | 16691 | 22110 | 28 |
| | EDTA | 17077 | 26191 | 42 |
| Table 2 | Reference | 15745 | 28170 | 57 |
| | EDTA | 17417 | 29545 | 52 |
| Table 5 | Reference | 15269 | 17528 | 14 |
| | EDTA | 15913 | 21895 | 32 |

Example 5 (Comparative)

The effect of the use of a disodium salt of the EDTA instead of the EDTA in a cement mixture is studied in the present invention. Table 7 shows the test expansion data on mortar under strongly accelerating conditions of exposure (NaOH 1N at 80° C.).

The following mixture proportions were adopted for performance of the tests:
aggregate/cement ratio equal to 1.88
water/cement ratio equal to 0.49
NaOH dissolved in the mixing water in a proportion of 1% by weight expressed as weight of $Na_2O$ referring to the binder.
Na-EDTA added in a proportion of 0.5% and 2% on cement, respectively equal to 0.1% and 0.3% by weight of mortar.

The behaviour of a mixture used as reference wherein Na-EDTA has not been used, is also recorded.

Table 7 shows only a mild effect reduction effect of the expansions with respect to the reference, probably to be attributed to the two non-complexing functional groups present in the disodium salt molecule of the EDTA.

The present example highlights that the use of a salt of EDTA, in this case a disodium salt, does not produce appreciable effects on the reduction of the expansions. In addition, the use of high sodium salt contents has led to undesirable variations of the rheology and of the mechanical characteristics of the mixtures. More in particular, the higher dose of Na-EDTA (0.3%) caused a strong reduction to 1 day of the elastic modulus with respect to the reference.

The use of a salt of EDTA must therefore be considered excluded from the scope of the present invention.

TABLE 7

| Use of disodium salt of the EDTA | Deformation (expansion) [μm/m] (Maturation in NaOH 1N at 80° C.) | | | Rheology (Spreading) [mm] UNI 7044 | Dynamic elastic modulus [MPa] (1 day) | Dynamic elastic modulus [MPa] (7 days) |
|---|---|---|---|---|---|---|
| | 7 days | 14 days | 28 days | | | |
| Reference | 3650 | 6006 | 8919 | 115 | 18461 | 19424 |
| Na-EDTA (0.1%) (outside the present invention) | 3344 | 5381 | 8106 | 131 | 18420 | 20215 |
| Na-EDTA (0.3%) (outside the present invention) | 4488 | 5975 | 8894 | 180 | 7809 | 18315 |

The invention claimed is:

1. A method of reducing the tendency of mortars or concretes to react with alkali and reducing the deformation by expansion resulting therefrom, wherein the method includes;

preparing a cementitious mixture;

adding an acid of formula:

$$[R-N-(CH_2-COOH)_n]_x \quad (I)$$

where R being is aliphatic or aromatic hydrocarbon chain, n=2 or 3 and x=1 or 2, and an addition selected from the group consisting of fly ash, microsilica, granulated blast furnace slag, powdered glass, to the cementitious mixture;

wherein said cementitious mixture does not include any salts of ethylene-diamino-tetraacetic acid; and forming the mortars or concretes from the combined mixture.

2. The method according to claim 1 wherein said acid of formula (I) is ethylenediaminetetraacetic acid, or EDTA, of formula:

$$(CH_2-COOH)_2-N-(CH_2)_2-N-(CH_2-COOH)_2.$$

* * * * *